United States Patent
Tohme et al.

(10) Patent No.: US 11,288,775 B2
(45) Date of Patent: Mar. 29, 2022

(54) METHODS AND SYSTEMS FOR PARAMETRIC NOISE MODULATION IN X-RAY IMAGING

(71) Applicant: GE Precision Healthcare LLC, Wauwatosa, WI (US)

(72) Inventors: Michel S Tohme, Wauwatosa, WI (US); German Guillermo Vera Gonzalez, Menomonee Falls, WI (US); Ping Xue, Pewaukee, WI (US); Justin M Wanek, Madison, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 24 days.

(21) Appl. No.: 16/941,081

(22) Filed: Jul. 28, 2020

(65) Prior Publication Data
US 2021/0158486 A1 May 27, 2021

Related U.S. Application Data

(60) Provisional application No. 62/941,696, filed on Nov. 27, 2019.

(51) Int. Cl.
*G06T 5/00* (2006.01)
*G06T 5/20* (2006.01)
*G06T 5/50* (2006.01)

(52) U.S. Cl.
CPC ............ *G06T 5/002* (2013.01); *G06T 5/20* (2013.01); *G06T 5/50* (2013.01); *G06T 2207/10116* (2013.01); *G06T 2207/20084* (2013.01)

(58) Field of Classification Search
CPC .. G06T 5/002; G06T 5/20; G06T 5/50; G06T 5/003; G06T 5/009; G06T 5/10; G06T 5/30; G06T 5/40; G06T 7/0012; G06T 2207/10116; G06T 2207/20084; G06T 2207/10081; G06T 2207/20081; G06T 2207/10012; G06T 2207/20016; G06T 2207/20008; G06T 2207/30004; G06T 2207/20012; G06T 2207/30061; G06T 2207/20036; G06T 2207/20076; G06T 2207/20212; G06T 2210/41; G06T 15/04; G06T 15/20; H05G 1/28; G01N 2223/419; G01N 2223/612; G01N 23/046;
(Continued)

(56) References Cited

U.S. PATENT DOCUMENTS 5,867,555 A 2/1999 Popescu
2011/0268238 A1* 11/2011 Lee .................. G21C 17/10
376/249

(Continued)

FOREIGN PATENT DOCUMENTS

EP 1429588 A2 6/2004
EP 2631870 A1 8/2013

*Primary Examiner* — Jose L Couso (57) ABSTRACT

Various methods and systems are provided for x-ray imaging. In one embodiment, a method comprises acquiring an image of a subject, generating, based on the image and a plurality of parameters, a noise modulation map comprising an estimated amount of noise in each pixel of the image, selectively reducing noise in the image based on the noise modulation map to generate a final image, and displaying the final image. In this way, the radiation dose during imaging may be reduced while maintaining or even improving image quality.

18 Claims, 6 Drawing Sheets

(58) Field of Classification Search
CPC ...... G06F 3/011; G06F 3/0304; G06F 3/0481;
G06F 3/04812; G06K 9/4623; G06K
9/6212; G06K 9/00664; G06N 3/049;
G06N 3/08–088; G06N 5/00; G06N 7/00;
G06N 20/00; A61B 6/5258; A61B
6/5217; A61B 6/032; A61B 6/542; A61B
6/488; A61B 6/461; A61B 6/5205; A61B
6/5235; A61B 6/5252; A61B 6/5282;
G02B 23/06; G02B 27/58; G02B 7/365;
Y10S 128/922
See application file for complete search history.

(56) References Cited

U.S. PATENT DOCUMENTS

| | | | | |
|---|---|---|---|---|
| 2012/0230470 | A1* | 9/2012 | Bertram | G01T 1/02 378/98.5 |
| 2013/0202177 | A1* | 8/2013 | Bar-Aviv | G06T 11/008 382/131 |
| 2014/0270053 | A1* | 9/2014 | Larson | A61B 6/032 378/4 |
| 2020/0105032 | A1* | 4/2020 | Yang | G06T 5/002 |
| 2020/0279354 | A1* | 9/2020 | Klaiman | G06T 5/005 |
| 2020/0311878 | A1* | 10/2020 | Matsuura | G06T 5/50 |
| 2021/0074036 | A1* | 3/2021 | Fuchs | G06T 9/002 |

\* cited by examiner

METHODS AND SYSTEMS FOR PARAMETRIC NOISE MODULATION IN X-RAY IMAGING

CROSS REFERENCE TO RELATED APPLICATIONS

The present application claims priority to U.S. provisional patent application Ser. No. 62/941,696 filed Nov. 27, 2019, incorporated herein by reference in its entirety.

BACKGROUND

Embodiments of the subject matter disclosed herein relate to x-ray imaging.

Imaging technologies such as x-ray imaging allow for non-invasive acquisition of images of internal structures or features of a subject, such as a patient. Digital x-ray imaging systems produce digital data which can be reconstructed into radiographic images. In digital x-ray imaging systems, radiation from a source is directed toward the subject. A portion of the radiation passes through the subject and impacts a detector. The detector includes an array of discrete picture elements or detector pixels and generates output signals based upon the quantity or intensity of the radiation impacting each pixel region. The output signals are subsequently processed to generate an image that may be displayed for review. These images are used to identify and/or examine the internal structures and organs within a patient's body.

BRIEF DESCRIPTION

In one embodiment, a method comprises acquiring an image of a subject, generating, based on the image and a plurality of parameters, a noise modulation map comprising an estimated amount of noise in each pixel of the image, selectively reducing noise in the image based on the noise modulation map to generate a final image, and displaying the final image. In this way, the radiation dose during imaging may be reduced while maintaining or even improving image quality.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DRAWINGS

The present invention will be better understood from reading the following description of non-limiting embodiments, with reference to the attached drawings, wherein below.

DETAILED DESCRIPTION

The following description relates to various embodiments of x-ray imaging. In particular, systems and methods are provided for parametric noise reduction in x-ray imaging. An x-ray imaging system, such as the imaging system depicted in FIGS. 1 and 2, may use an x-ray source and an x-ray detector to acquire radiographic images of a subject, such as a patient. Such radiographic images typically exhibit noise arising from quantum and electronic sources, which result in random variations in image brightness that give a mottled, grainy, textured, or snowy appearance to the images. Although noise gives an image a generally undesirable appearance, the most significant effect is that the noise may cover or reduce the visibility of certain features within the image. Besides increasing the dose to the patient to improve the image quality, the noise can be reduced via image processing techniques. The resulting perceived noise is not equal across the entire x-ray image. For example, in a typical x-ray chest exam, low-photon count areas such as the abdomen may exhibit more noise than lower-attenuation regions such as the lungs where higher photon counts are registered in the raw acquired image. Moreover, the displayed pixel size on a viewing screen also impacts the appearance of noise. A system for selectively modulating noise suppression, such as the system depicted in FIG. 3, includes a noise modulation map generator that models a noise metric on a pixel-by-pixel basis in the acquired image based on a plurality of parameters. A noise modulation map thus acquired may be used, as shown in the method depicted in FIG. 4, to selectively reduce noise across the image according to the estimated noise metric. The methods provided herein for selectively modulating noise based on various parameters are illustrated by the example images shown in FIGS. 5-10.

While the systems and methods provided herein are described with regard to x-ray imaging techniques, it should be appreciated that the techniques provided herein may also be applied to various imaging modalities, including various modalities of x-ray imaging (e.g., single energy, dual energy, tomography, image pasting, fluoroscopy, mammography, and so on), computed tomography (CT), and positron emission tomography.

Figure 1:
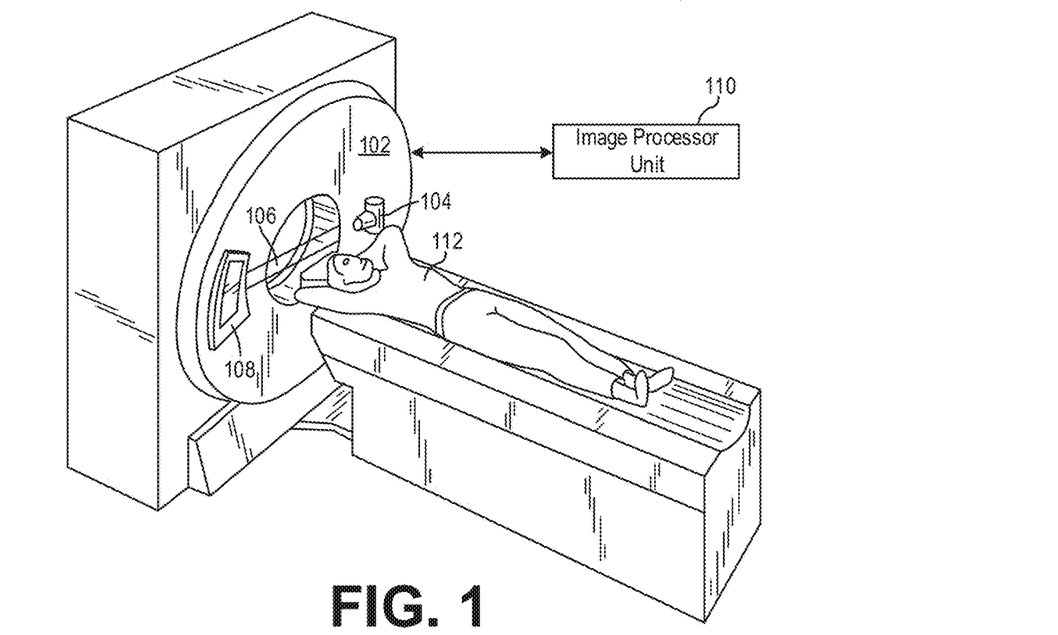
FIG. 1 shows a pictorial view of an imaging system, according to an embodiment.

FIG. 1 illustrates an exemplary CT system 100 configured for CT imaging. Particularly, the CT system 100 is configured to image a subject 112 such as a patient, an inanimate object, one or more manufactured parts, and/or foreign objects such as dental implants, stents, and/or contrast agents present within the body. In one embodiment, the CT system 100 includes a gantry 102, which in turn, may further include at least one x-ray source 104 configured to project a beam of x-ray radiation 106 for use in imaging the subject 112. Specifically, the x-ray source 104 is configured to project the x-rays 106 towards a detector array 108 positioned on the opposite side of the gantry 102. Although FIG. 1 depicts only a single x-ray source 104, in certain embodiments, multiple x-ray radiation sources and detectors may be employed to project a plurality of x-rays 106 for acquiring projection data at different energy levels corresponding to the patient. In some embodiments, the x-ray source 104 may enable dual-energy gemstone spectral imaging (GSI) by rapid peak kilovoltage (kVp) switching. In some embodiments, the x-ray detector employed is a photon-counting detector which is capable of differentiating x-ray photons of different energies. In other embodiments, two sets of x-ray tube-detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, a radiation source projects a cone-shaped beam which is collimated to lie within an X-Y-Z plane of a Cartesian coordinate system and generally referred to as an "imaging plane." The radiation beam passes through an object being imaged, such as the patient or subject 112. The beam, after being attenuated by the object, impinges upon an array of radiation detectors. The intensity of the attenuated radiation beam received at the detector array is dependent upon the attenuation of a radiation beam by the object. Each detector element of the array produces a separate electrical signal that is a measurement of the beam attenuation at the detector location. The attenuation measurements from all the detector elements are acquired separately to produce a transmission profile.

In some CT systems, the radiation source and the detector array are rotated with a gantry within the imaging plane and around the object to be imaged such that an angle at which the radiation beam intersects the object constantly changes. A group of radiation attenuation measurements, e.g., projection data, from the detector array at one gantry angle is referred to as a "view." A "scan" of the object includes a set of views made at different gantry angles, or view angles, during one revolution of the radiation source and detector. It is contemplated that the benefits of the methods described herein accrue to medical imaging modalities other than CT, so as used herein the term "view" is not limited to the use as described above with respect to projection data from one gantry angle. The term "view" is used to mean one data acquisition whenever there are multiple data acquisitions from different angles, whether from a CT, positron emission tomography (PET), or single-photon emission CT (SPECT) acquisition, and/or any other modality including modalities yet to be developed as well as combinations thereof in fused embodiments.

The projection data is processed to reconstruct an image that corresponds to a two-dimensional slice taken through the object or, in some examples where the projection data includes multiple views or scans, a three-dimensional rendering of the object. One method for reconstructing an image from a set of projection data is referred to in the art as the filtered back projection technique. Transmission and emission tomography reconstruction techniques also include statistical iterative methods such as maximum likelihood expectation maximization (MLEM) and ordered-subsets expectation-reconstruction techniques as well as iterative reconstruction techniques. This process converts the attenuation measurements from a scan into integers called "CT numbers" or "Hounsfield units," which are used to control the brightness of a corresponding pixel on a display device.

To reduce the total scan time, a "helical" scan may be performed. To perform a "helical" scan, the patient is moved while the data for the prescribed number of slices is acquired. Such a system generates a single helix from a cone beam helical scan. The helix mapped out by the cone beam yields projection data from which images in each prescribed slice may be reconstructed.

As used herein, the phrase "reconstructing an image" is not intended to exclude embodiments of the present invention in which data representing an image is generated but a viewable image is not. Therefore, as used herein, the term "image" broadly refers to both viewable images and data representing a viewable image. However, many embodiments generate (or are configured to generate) at least one viewable image.

Figure 2:
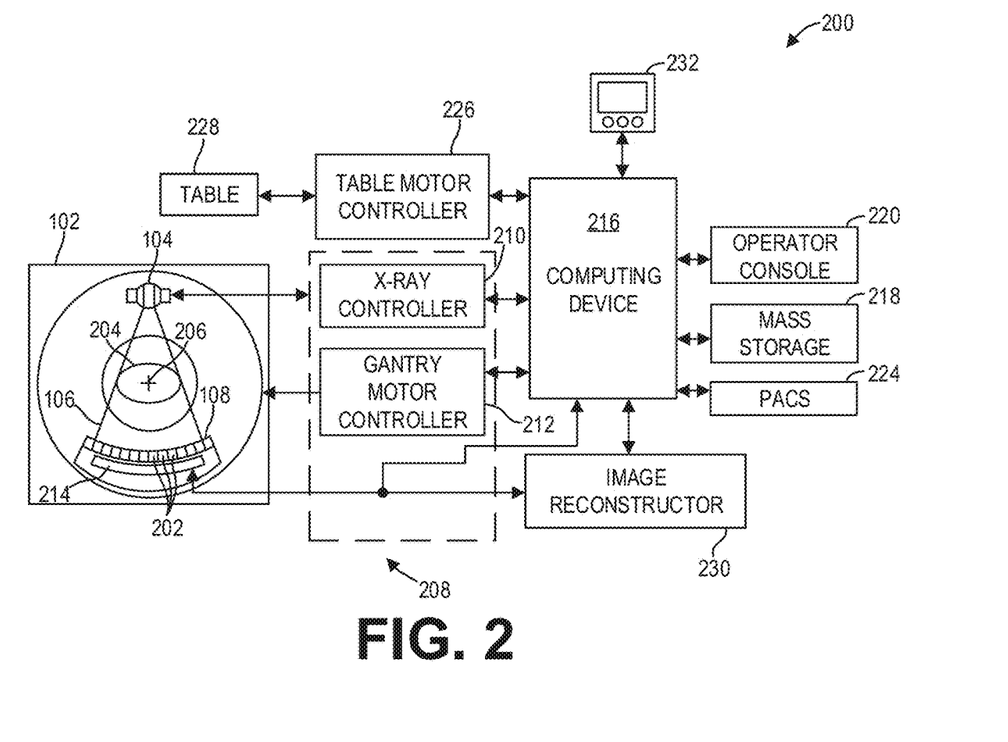
FIG. 2 shows a block schematic diagram of an exemplary imaging system, according to an embodiment.

FIG. 2 illustrates an exemplary imaging system 200 similar to the CT system 100 of FIG. 1. In accordance with aspects of the present disclosure, the imaging system 200 is configured for imaging a subject 204 (e.g., the subject 112 of FIG. 1). In one embodiment, the imaging system 200 includes the detector array 108 (see FIG. 1). The detector array 108 further includes a plurality of detector elements 202 that together sense the x-ray beams 106 (see FIG. 1) that pass through the subject 204 (such as a patient) to acquire corresponding projection data. Accordingly, in one embodiment, the detector array 108 is fabricated in a multi-slice configuration including the plurality of rows of cells or detector elements 202. In such a configuration, one or more additional rows of the detector elements 202 are arranged in a parallel configuration for acquiring the projection data.

In certain embodiments, the imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the x-ray source 104 and the detector array 108 rotate, the detector array 108 collects data of the attenuated x-ray beams. The data collected by the detector array 108 undergoes pre-processing and calibration to condition the data to represent the line integrals of the attenuation coefficients of the scanned subject 204. The processed data are commonly called projections.

In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a volume rendering of the basis material, for example, bone, soft tissue, and/or contrast agent, in the imaged volume.

Once reconstructed, the basis material image produced by the imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the imaging system 200 includes a control mechanism 208 to control movement of the components such as rotation of the gantry 102 and the operation of the x-ray source 104. In certain embodiments, the control mechanism 208 further includes an x-ray controller 210 configured to provide power and timing signals to the x-ray source 104. Additionally, the control mechanism 208 includes a gantry motor controller 212 configured to control a rotational speed and/or position of the gantry 102 based on imaging requirements.

In certain embodiments, the control mechanism 208 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the x-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates only one operator console 220, more than one operator console may be coupled to the imaging system 200, for example, for inputting or outputting system parameters, requesting examinations, plotting data, and/or viewing images. Further, in certain embodiments, the imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 228 which may be a motorized table. Specifically, the table motor controller 226 may move the table 228 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized x-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the imaging system 200 and instead the computing device 216 may perform one or more functions of the image reconstructor 230. Moreover, the image reconstructor 230 may be located locally or remotely, and may be operatively connected to the imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

The various methods and processes (such as the method described below with reference to FIG. 4) described further herein may be stored as executable instructions in non-transitory memory on a computing device (or controller) in imaging system 200. In one embodiment, image reconstructor 230 may include such executable instructions in non-transitory memory, and may apply the methods described herein to reconstruct an image from scanning data. In another embodiment, computing device 216 may include the instructions in non-transitory memory, and may apply the methods described herein, at least in part, to a reconstructed image after receiving the reconstructed image from image reconstructor 230. In yet another embodiment, the methods and processes described herein may be distributed across image reconstructor 230 and computing device 216.

In one embodiment, the display 232 allows the operator to evaluate the imaged anatomy. The display 232 may also allow the operator to select a volume of interest (VOI) and/or request patient information, for example, via a graphical user interface (GUI) for a subsequent scan or processing.

Figure 3:
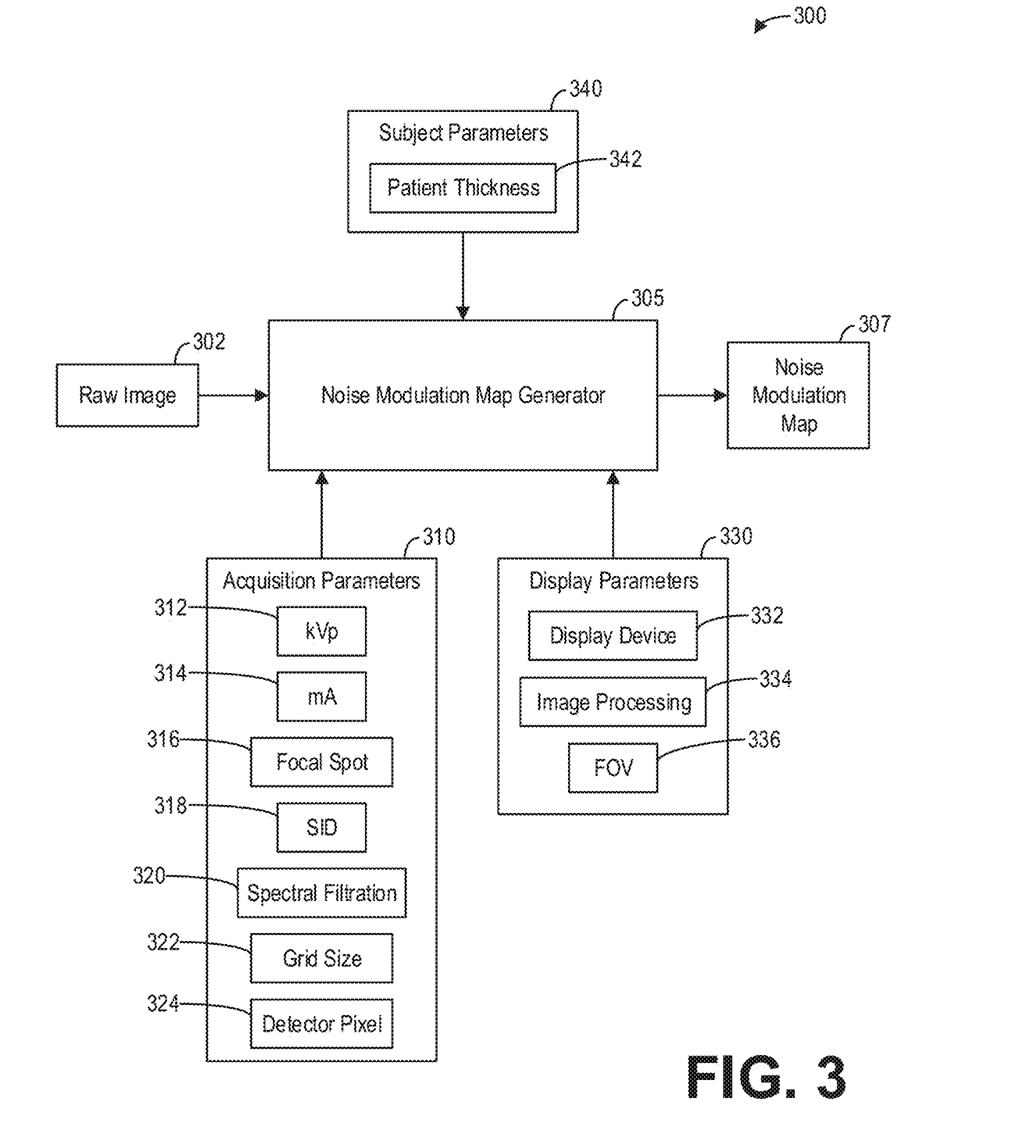
FIG. 3 shows a block diagram illustrating an exemplary noise modulation map generator, according to an embodiment.

FIG. 3 shows a block diagram illustrating an exemplary noise modulation map generator 305, according to an embodiment. The noise modulation map generator 305 generates a noise modulation map 307 based on a raw image 302. In particular, the noise modulation map generator 305 estimates the noise modulation map 307 which comprises a noise metric on a pixel-by-pixel basis for the raw image 302 based on one or more acquisition parameters 310, display parameters 330, and subject parameters 340. The noise modulation map generator 305 may be implemented in the computing device 216 of the imaging system 200, for example, or in the image processor unit 110 of the system 100. In some examples, the noise modulation map generator 305 may comprise a trained deep learning model, such as a deep neural network or another type of deep learning model, configured to accept the raw image 302 and a plurality of parameters as input, and output the noise modulation map 307. In other examples, the noise modulation map generator 305 may comprise a linear or non-linear regression model configured to accept the raw image 302 and a plurality of parameters as input, and output the noise modulation map 307.

The noise metric may comprise, as an illustrative and non-limiting example, an estimate of the signal-to-noise ratio (SNR) at each pixel location in the raw image 302. As another example, the noise metric may comprise, for example, an estimate of the contrast-to-noise ratio (CNR) for each pixel location in the raw image 302.

The noise modulation map 307 thus comprises an estimate of how much noise is present in each pixel of the raw image 302. As described further herein, the noise modulation map 307 is used to determine how much noise to remove from an image. For example, when the noise metric comprises SNR, the noise metric ranges from zero to one, wherein a value of zero indicates that the pixel is entirely noise without x-ray signal and wherein a value of one indicates that the pixel is entirely x-ray signal without noise. By using the noise modulation map 307 to modulate the distribution of noise reduction in an image, more noise is removed from pixels with low SNR than from pixels with high SNR. In this way, noise suppression is not equal or global across the image, but rather depends on the signal level of the raw image 302.

While an estimate of a noise metric such as SNR may be determined solely from the raw image 302, the noise modulation map generator 305 models the noise metric based on additional parameters such as acquisition parameters 310, display parameters 330, and subject parameters 340 that may further impact noise.

The acquisition parameters 310 comprise parameters relating to the acquisition of the raw image 302 that may impact image noise. For example, the acquisition parameters 310 may include, but are not limited to, one or more of a tube peak kilovoltage (kVp) 312, a tube current (mA) 314, a focal spot size 316, a source-to-image distance (SID) 318, a spectral filtration 320, grid size 322, and a detector pixel 324. The kVp 312, for example, has a strong impact on the noise level, as x-rays generated from a higher kVp 312 will have a higher energy than x-rays generated from a lower kVp 312, and so will have a correspondingly higher penetrative power, thereby boosting the SNR across the image. Similarly, the mA 314 may have a strong impact, as a larger number of x-rays are generated for a higher mA 314 than for a lower mA 314. The focal spot size 316 impacts the noise level as the focal spot size 316 determines the imaged area on the detector. The SID 318 impacts the noise level because the SID 318 determines the distance that x-rays travel from the x-ray source to the x-ray detector, and so more x-rays may scatter for a larger SID 318, such that the SNR may be decreased relative to a smaller SID 318. The spectral filtration 320 impacts the noise level as the type of spectral filtration 320 (e.g., copper filtration, aluminum-copper filtration, and so on) impacts the spectrum of the x-rays, thereby also changing the response of the detector. Increasing the spectral filtration 320 causes a decrease in x-ray counts, and so the SNR may be decreased for increased spectral filtration 320. The grid size 322 comprises the size of an anti-scatter grid positioned in front of a detecting surface of the x-ray detector, and so the grid size 322 of the anti-scatter grid impacts the SNR by impacting the number of scattered x-rays detected by the x-ray detector. The detector pixel 324 impacts the noise level as the noise characteristics for a large detector pixel are different from the noise characteristics for a small detector pixel, as for a same dose the large detector pixel receives more x-ray counts due to its increased area in comparison to the small detector pixel, and so the SNR may be increased or decreased according to a size of the detector pixel 324.

The display parameters 330 comprise parameters relating to the display of an image to a user for review that may impact image noise. For example, the display parameters 330 may include, but are not limited to, one or more of a display device 332, image processing 334, and a field-of-view (FOV) 336. The type of display device 332 impacts the image noise because the different screen technologies, frame rates, and so on associated with the display device 332 impact how the image may be perceived by the user. Similarly, image processor 334 impacts the image noise as different types of processing may increase or decrease the apparent image noise. The FOV 336 impacts the image noise because, for a smaller FOV, the pixels in the smaller FOV are blown up or zoomed in to the size of the full window screen, and so the displayed pixel size is impacted by the FOV 336. For a smaller FOV 336, for example, the noise may essentially be amplified. By taking into account how the image will be displayed to the user based on the display parameters 330, the noise modulation map generator 305 may more effectively model how noise modulation may be applied.

The subject parameters 340 comprise parameters relating to the subject imaged in the raw image 302 that may impact image noise. For example, the subject parameters 340 may include, but are not limited to, patient thickness 342. Patient thickness 342 impacts the noise level, as patients with a greater patient thickness 342 will more strongly attenuate x-rays, thereby reducing the SNR.

In some examples, the noise modulation map generator 305 may generate the noise modulation map 307 based on all of the acquisition parameters 310, the display parameters 330, the subject parameters 340, and the raw image 302. In other examples, the noise modulation map generator 305 may model the noise based on a weighted combination of the acquisition parameters 310, the display parameters 330, the subject parameters 340, and the raw image 302, according to a relative impact on the noise level for each parameter. In yet other examples, the noise modulation map generator 305 may generate the noise modulation map 307 based on the raw image 302 and a subset of the parameters depicted in FIG. 3. For example, the noise modulation map generator 305 may generate the noise modulation map 307 based on the raw image 302, the kVp 312, and the detector pixel 324.

Thus, the noise modulation is a model derived from the quantum statistics of the acquired x-ray image as well as various parameters such as kVp, SID, spectral filtration, patient thickness, grid size, focal spot size, detector quantum efficiency, detector pixel size, display device, and FOV. The noise modulation model attempts to estimate the SNR at each pixel location in the image. the model is obtained by linear or non-linear regression of a large amount of x-ray acquisitions using a range of acquisition parameters. The SNR model may also be obtained by training a deep learning model with the acquired dataset to estimate the localized SNR value. The noise modulation map thus obtained from the model maps on a pixel-by-pixel basis how much noise is suppressed at each location of the x-ray image. As described further herein, for a chest examination, the abdomen region which exhibits lower SNR will have a larger portion of noise removed, whereas a lung region which exhibits a higher SNR will have a larger portion of its noise preserved in the final image. While SNR is discussed as a noise metric of choice to determine how much noise is to be suppressed or preserved in the final image, it should be appreciated that other noise metrics such as CNR may be used without departing from the scope of the present disclosure.

Figure 4:
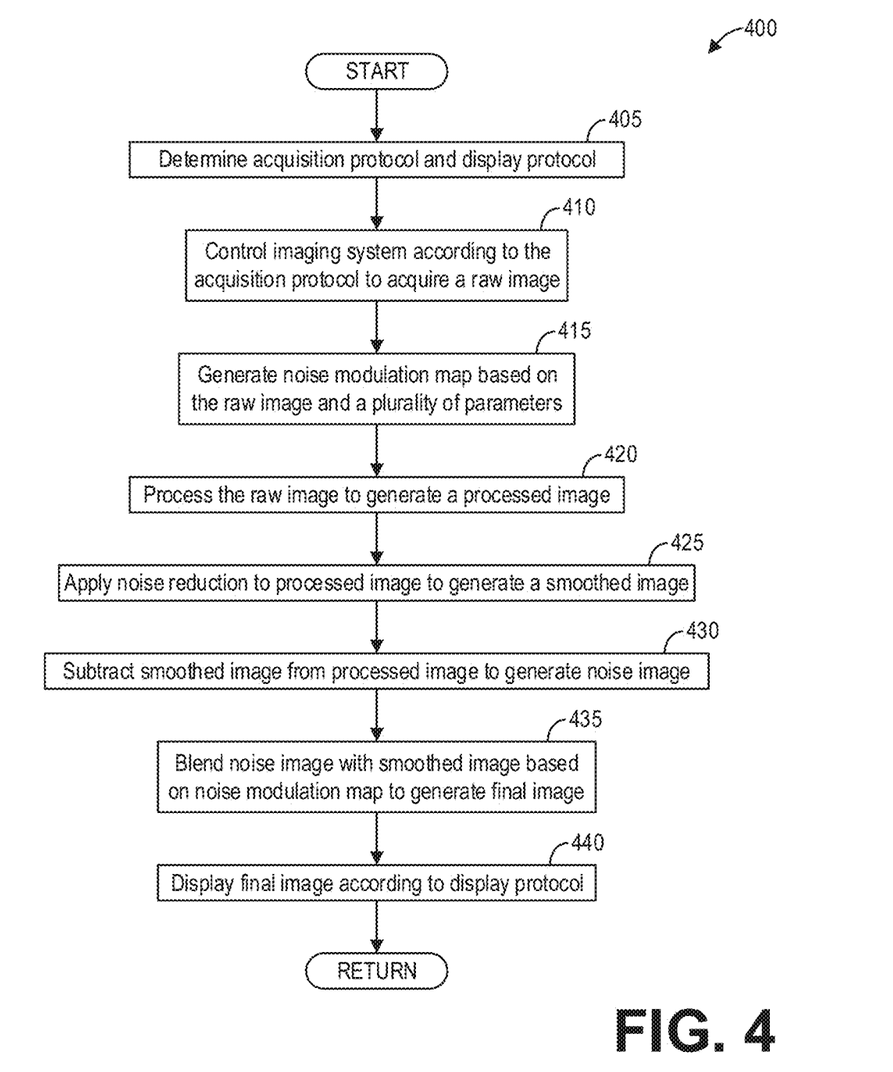
FIG. 4 shows a high-level flow chart illustrating an example method for parametric noise modulation in image noise reduction, according to an embodiment.

FIG. 4 shows a high-level flow chart illustrating an example method 400 for parametric noise modulation in image noise reduction, according to an embodiment. In particular, method 400 relates to modeling a noise distribution throughout an image based on various parameters, and modulating an amount of noise reduction throughout the image. Method 400 is described with regard to the systems and components of FIGS. 1-3, though it should be appreciated that the method 400 may be implemented with other systems and components without departing from the scope of the present disclosure. Method 400 may be implemented as instructions in the non-transitory memory of the computing device 216 that are executable by the computing device 216 to perform the actions described herein, as an illustrative example.

Method 400 begins at 405. At 405, method 400 determines an acquisition protocol and a display protocol. The acquisition protocol comprises a set of acquisition parameters, such as the acquisition parameters 310, relating to the acquisition of an image. The display protocol comprises a set of display parameters, such as the display parameters 330, relating to how an image will be displayed. In some examples, a user of the imaging system 200 may select, via the operator console 220, the acquisition protocol and the display protocol from a plurality of acquisition protocols and display protocols. Alternatively, method 400 may automatically determine the acquisition protocol and/or the display protocol based on a clinical task for imaging a subject, or based on default settings for the acquisition protocol and/or the display protocol. Further, in some examples, method 400 may additionally determine one or more subject parameter, such as subject parameters 340, relating to the subject to be imaged.

Figure 5:
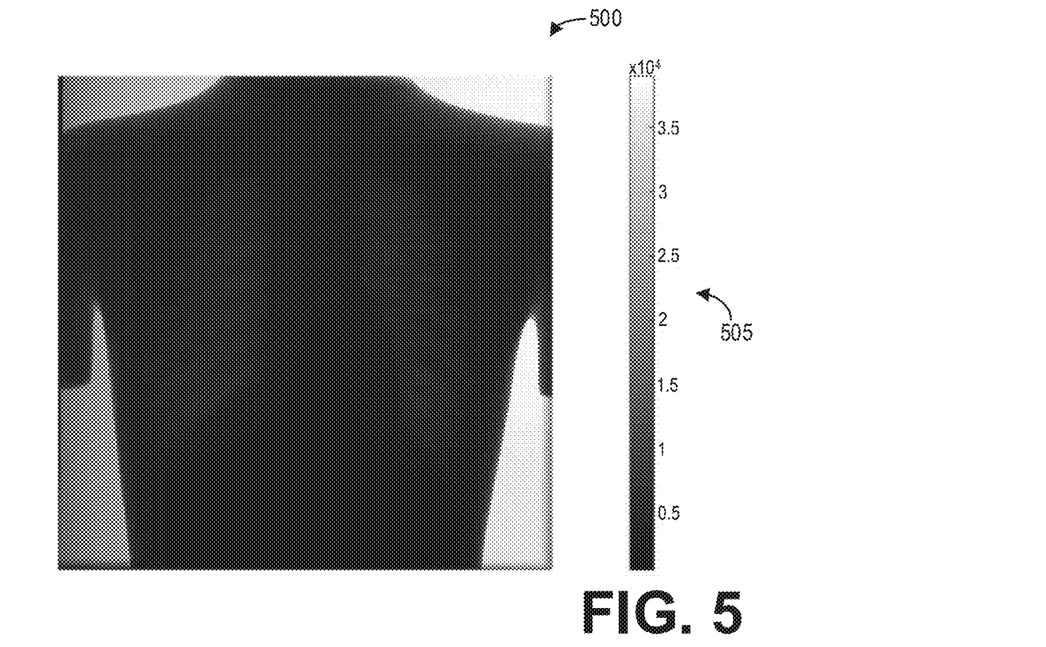
FIG. 5 shows an example raw image without noise reduction applied, according to an embodiment.

Continuing at 410, method 400 controls the imaging system according to the acquisition protocol to acquire a raw image. For example, method 400 may control the x-ray source 104 and the detector array 108 of the imaging system 200 according to the acquisition parameters of the acquisition protocol to acquire a raw image of the subject 204. As an illustrative and non-limiting example, FIG. 5 shows an example raw image 500 without any processing applied. As the raw image 500 depicts photon counts per pixel, the legend 505 indicates that higher photon counts are depicted as white while lower photon counts are depicted in black, indicating regions wherein lower or higher x-ray attenuation occurs, respectively.

Figure 6:
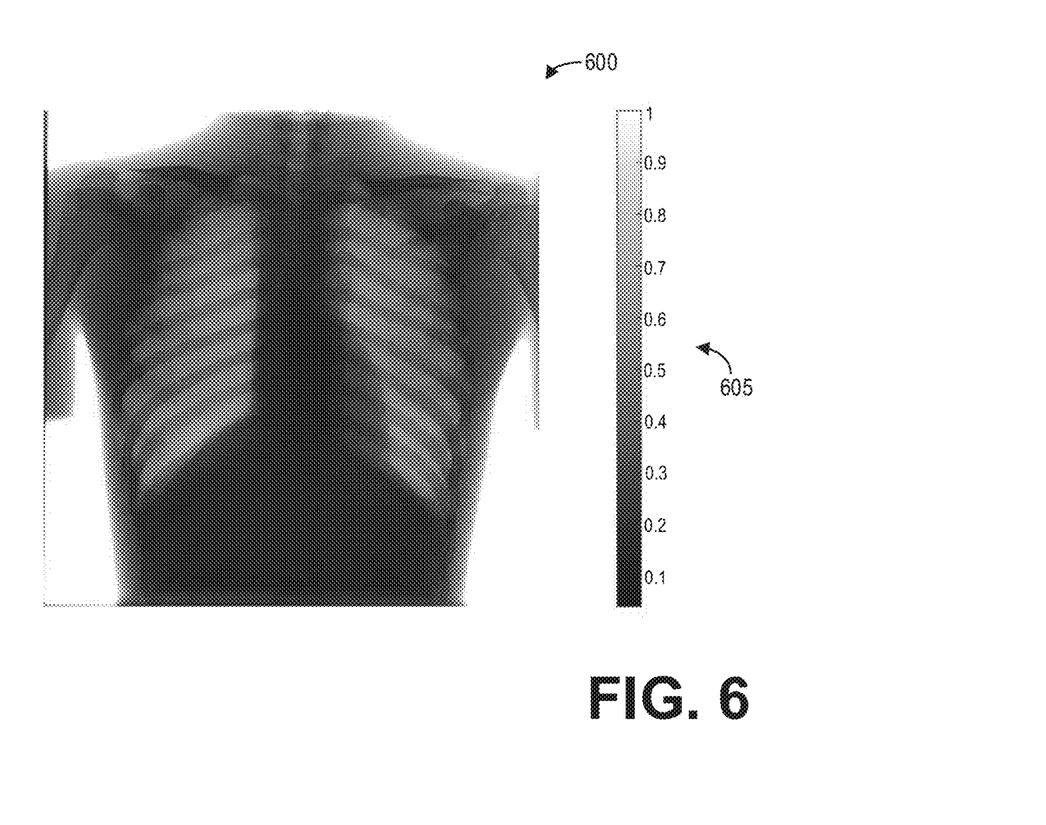
FIG. 6 shows an example noise modulation map generated from the raw image of FIG. 5, according to an embodiment.

After acquiring the raw image, method 400 continues to 415. At 415, method 400 generates a noise modulation map based on the raw image and a plurality of parameters. For example, method 400 inputs the raw image acquired at 410 to the noise modulation map generator 305, along with one or more acquisition parameters 310 determined from the acquisition protocol, display parameters 330 determined from the display protocol, and one or more subject parameters 340, to generate the noise modulation map 307. As an illustrative and non-limiting example, FIG. 6 shows an example noise modulation map 600 generated from the raw image 500. The noise modulation map 600 comprises an estimate of a noise metric, such as SNR, ranging from zero to one, as depicted by the legend 605, for each pixel of the raw image 500. Thus pixels with a value of one correspond to regions where the x-ray signal substantially outweighs the noise, while pixels with a value of zero correspond to regions where the noise substantially outweighs the x-ray signal.

Figure 7:
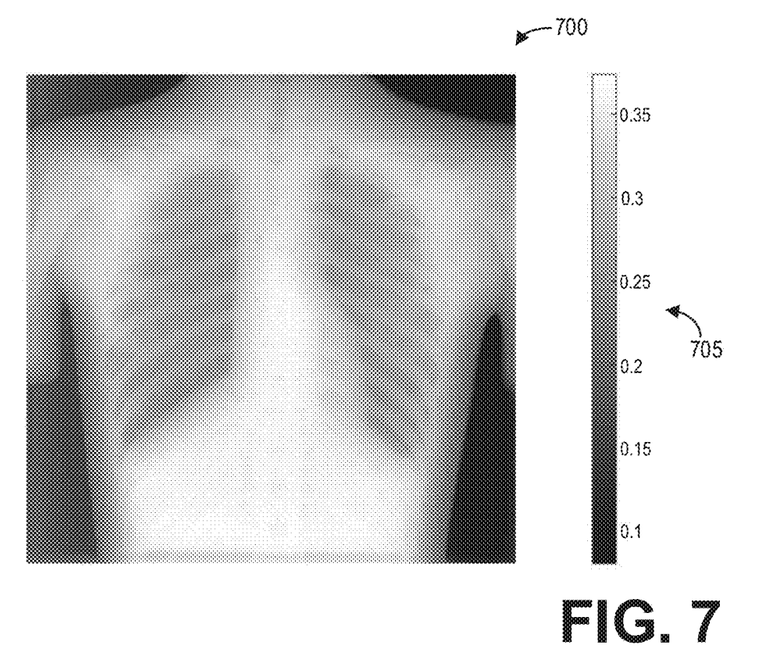
FIG. 7 shows an example processed image generated from the raw image of FIG. 5, according to an embodiment.

Continuing at 420, method 400 processes the raw image acquired at 410 to generate a processed image. For example, method 400 may process the raw image to normalize the photon counts to change the range of pixel intensity values and/or to map the photon counts to pixel values. As an illustrative and non-limiting example, FIG. 7 shows an example processed image 700 generated from the raw image 500, where the legend 705 indicates that the pixel values range from zero to 0.4. By normalizing and re-mapping the photon counts to the pixel values depicted in the processed image 700, the internal structures are more visible in comparison to the raw image 500.

Figure 8:
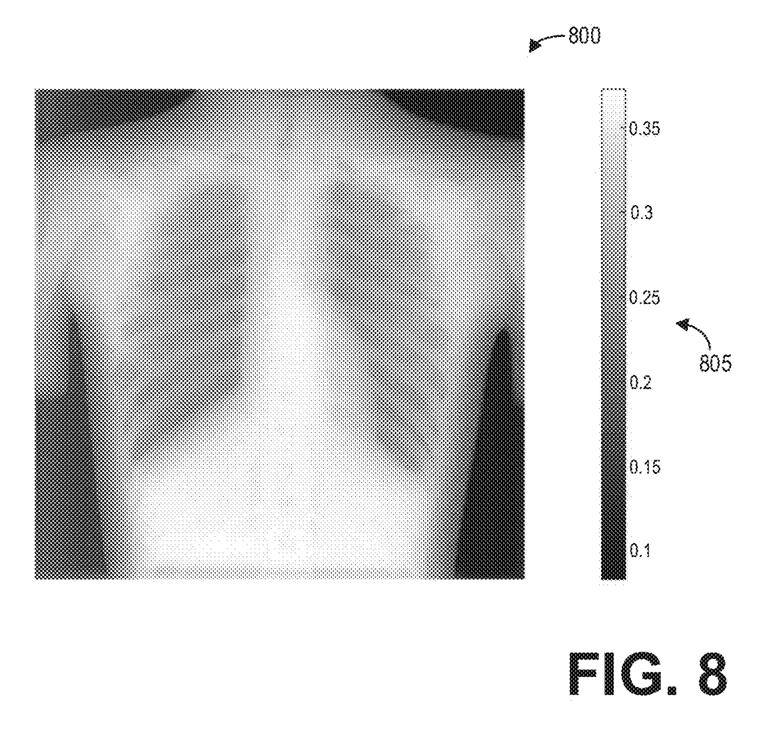
FIG. 8 shows an example noise-reduced image generated from the processed image of FIG. 7, according to an embodiment.

After pre-processing the raw image to generate the processed image, method 400 continues to 425. At 425, method 400 applies noise reduction to the processed image to generate a smoothed image. For example, the noise reduction may comprise a noise filter applied to the processed image, or another type of noise reduction technique that smooths the processed image. The noise reduction applied to the processed image globally reduces the noise across the processed image. As an illustrative and non-limiting example, FIG. 8 shows an example noise-reduced or smoothed image 800 generated from the processed image 700, where the legend 805 indicates that the pixel values are relatively consistent with the pixel values of the processed image 700.

Figure 9:
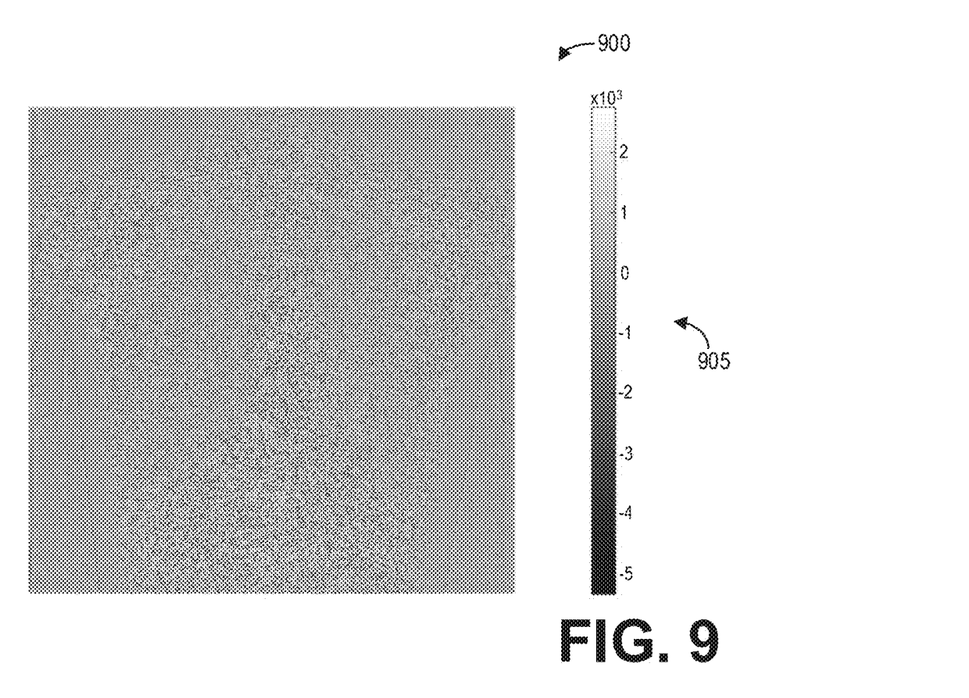
FIG. 9 shows an example noise image generated from the processed image of FIG. 7 and the noise-reduced image of FIG. 8, according to an embodiment.

Rather than simply outputting the smoothed image obtained at 425, method 400 uses the noise modulation map obtained at 415 to modulate the noise distribution in the image. To that end, at 430, method 400 subtracts the smoothed image from the processed image to generate a noise image. The noise image thus comprises the noise removed from the processed image in the smoothed image. As an illustrative and non-limiting example, FIG. 9 shows an example noise image 900 generated from the processed image 700 and the noise-reduced image 800. The legend 905 depicts the range of noise removed from the processed image 700 during the global noise filtering at 425.

Figure 10:
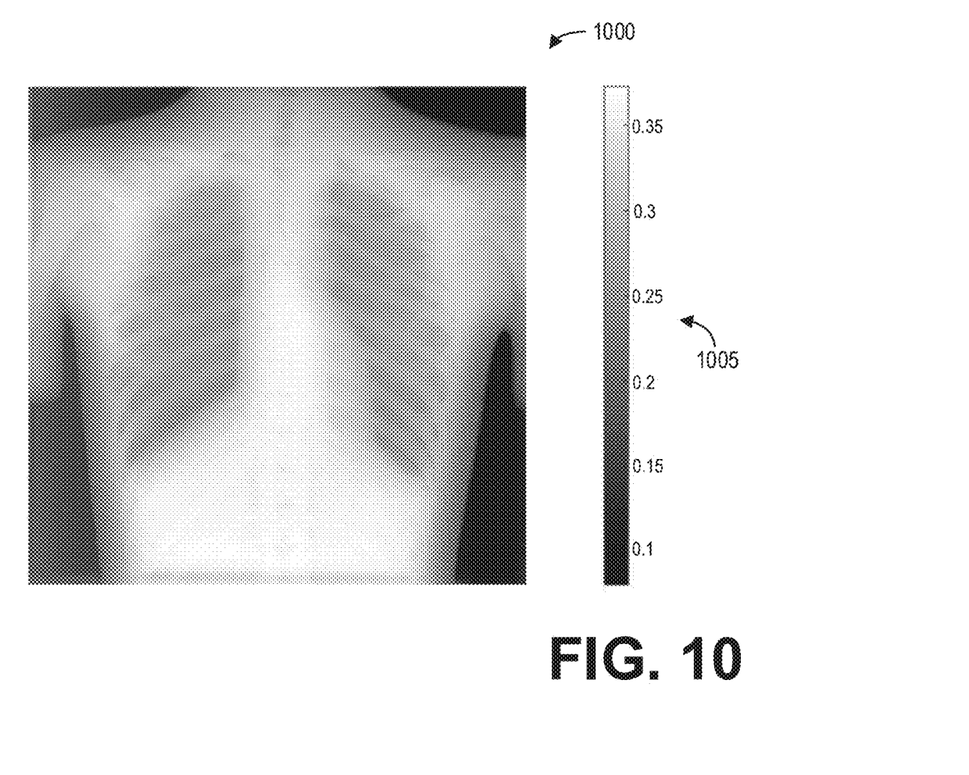
FIG. 10 shows an example noise-modulated image generated from the noise image of FIG. 9 and the noise-reduced image of FIG. 8 based on the noise modulation map of FIG. 6, according to an embodiment.

Continuing at 435, method 400 blends the noise image with the smoothed image based on the noise modulation map to generate a final image. For example, method 400 may multiple the noise image with the noise modulation map to modulate the noise. Method 400 may then add the modulated noise to the smoothed image to selectively re-introduce at least some noise removed from the processed image back to the smoothed image. As an illustrative and non-limiting example, FIG. 10 shows an example noise-modulated image 1000 generated from the noise image 900 and the smoothed image 800 based on the noise modulation map 600. The legend 1005 indicates that the range of pixel values are consistent with the smoothed image 800. As depicted in the noise modulation map 600, the SNR in the lungs is substantially higher than the SNR in the abdomen of the imaged subject. As a result, the noise filtered from the lung region may actually include valid signal rather than noise, and so the signal is added back to the lung region when multiplying the noise image 900 by the noise modulation map 600 and adding the modulated noise back to the smoothed image 800. Conversely, the noise filtered from the abdomen region likely corresponds to actual noise rather than x-ray signal, and so the lower SNR values of the noise modulation map 600 in the abdomen region results in less noise from the noise image 900 being added back to the smoothed image 800.

At 440, method 400 displays the final image, such as the noise-modulated image 1000, according to the display protocol. In examples wherein the noise modulation map is generated based on the display protocol, the noise of the final image is improved. Method 400 then returns.

Thus, a method for x-ray imaging includes adaptively reducing the noise based on a noise metric such as SNR, such that low SNR areas receive a higher noise suppression than high SNR areas. Using the noise modulation map as described herein allows for the use of a strong filter kernel to be applied to the image during the noise reduction, for example, while the modulating of the noise enables effective noise reduction in low SNR areas and limits the effect of the strong smoothing operation in high SNR regions of the image.

A technical effect of the present disclosure includes the modulation of noise reduction across an image based on a noise metric. Another technical effect of the disclosure includes the selective modulation of noise in an image based on acquisition parameters. Another technical effect of the disclosure includes an improved estimate of signal-to-noise ratio in x-ray images. Yet another technical effect of the disclosure includes improved image quality. Another technical effect of the disclosure includes the reduction of radiation dose while maintaining image quality.

In one embodiment, a method comprises acquiring an image of a subject, generating, based on the image and a plurality of parameters, a noise modulation map comprising an estimated amount of noise in each pixel of the image, selectively reducing noise in the image based on the noise modulation map to generate a final image, and displaying the final image.

In a first example of the method, generating the noise modulation map comprises inputting the image and the plurality of parameters to a noise modulation model that outputs the noise modulation map. In a second example of the method optionally including the first example, the noise modulation model comprises a trained deep learning model. In a third example of the method optionally including one or more of the first and second examples, the noise modulation model comprises a linear or non-linear regression model. In a fourth example of the method optionally including one or more of the first through third examples, the plurality of parameters includes at least two parameters selected from acquisition parameters relating to the acquisition of the image, display parameters relating to the display of the final image, and subject parameters relating to the subject being imaged. In a fourth example of the method optionally including one or more of the first through third examples, the acquisition parameters include one or more of a tube voltage applied to an x-ray source during image acquisition, a tube current applied to the x-ray source during image acquisition, a focal spot size, a distance between the x-ray source and an x-ray detector, an amount of spectral filtration, a size of an anti-scatter grid disposed in front of the x-ray detector, and a detector pixel of the x-ray detector. In a fifth example of the method optionally including one or more of the first through fourth examples, the display parameters include one or more of a type of display device for displaying the final image, an image processing technique, and a field-of-view. In a sixth example of the method optionally including one or more of the first through fifth examples, the subject parameters include a thickness of the subject. In a seventh example of the method optionally including one or more of the first through sixth examples, the method further comprises applying noise reduction to the image to generate a smoothed image, and subtracting the smoothed image from the image to generate a noise image, wherein selectively reducing noise in the image based on the noise modulation map to generate the final image comprises blending the noise image with the smoothed image according to the noise modulation map.

In another embodiment, a method comprises controlling an x-ray source and an x-ray detector to acquire an image of a subject, measuring, based on the image and a plurality of parameters, an estimated amount of noise in each pixel of the image, applying noise reduction throughout the image to generate a smoothed image, subtracting the smoothed image from the image to generate a noise image, multiplying the noise modulation map with the noise image to generate a modulated noise image, adding the modulated noise image to the smoothed image to generate a final image, and displaying the final image.

In a first example of the method, measuring the estimated amount of noise in each pixel of the image comprises inputting the image and the plurality of parameters to a noise modulation model that outputs the estimated amount of noise in each pixel of the image. In a second example of the method optionally including the first example, the estimated amount of noise in each pixel of the image comprises an estimate of signal-to-noise ratio determined for each pixel based on the image and the plurality of parameters. In a third example of the method optionally including one or more of the first and second examples, the noise modulation model comprises one of a trained deep learning model, a linear regression model, or a non-linear regression model. In a fourth example of the method optionally including one or more of the first through third examples, the plurality of parameters includes a peak tube kilovoltage applied to the x-ray source during acquisition of the image, and a size of detector pixels of the x-ray detector. In a fifth example of the method optionally including one or more of the first through fourth examples, the plurality of parameters further includes one or more of a tube current applied to the x-ray source during image acquisition, a focal spot size, a distance between the x-ray source and the x-ray detector, an amount of spectral filtration, a size of an anti-scatter grid disposed in front of the x-ray detector, a type of display device for displaying the final image, an image processing technique, a field-of-view for displaying the final image, and a thickness of the subject.

In yet another embodiment, a system comprises an x-ray source for generating x-rays, an x-ray detector configured to detect the x-rays, a display device, and a processor configured with instructions in non-transitory memory that when executed cause the processor to: acquire an image of a subject; generate, based on the image and a plurality of parameters, a noise modulation map comprising an estimated amount of noise in each pixel of the image; selectively reduce noise in the image based on the noise modulation map to generate a final image; and display, via the display device, the final image.

In a first example of the system, to generate the noise modulation map, the processor is configured with instructions in the non-transitory memory that when executed cause the processor to input the image and the plurality of parameters to a noise modulation model that outputs the noise modulation map. In a second example of the system optionally including the first example, the noise modulation model comprises one or more of a trained deep learning model, a linear regression model, and a non-linear regression model. In a third example of the system optionally including one or more of the first and second examples, the plurality of parameters includes two or more of a peak tube kilovoltage applied to the x-ray source during image acquisition, a tube current applied to the x-ray source during image acquisition, a focal spot size, a distance between the x-ray source and the x-ray detector, an amount of spectral filtration, a size of an anti-scatter grid disposed in front of the x-ray detector, a size of detector pixels in the x-ray detector, a type of the display device for displaying the final image, an image processing technique for processing the image, a field-of-view for displaying the final image, and a thickness of the subject. In a fourth example of the system optionally including one or more of the first through third examples, the processor is further configured with instructions in the non-transitory memory that when executed cause the processor to: pre-process the image to generate a processed image, the pre-processing including at least a normalization of photon counts; apply noise reduction throughout the processed image to generate a smoothed image; subtract the smoothed image from the processed image to generate a noise image; multiply the noise modulation map with the noise image to generate a modulated noise image; and add the modulated noise image to the smoothed image to generate a final image.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
    acquiring an image of a subject;
    generating, based on the image and a plurality of parameters, a noise modulation map comprising an estimated amount of noise in each pixel of the image;
    selectively reducing noise in the image based on the noise modulation map to generate a final image; and
    displaying the final image;
    wherein the method further comprises applying noise reduction to the image to generate a smoothed image, and subtracting the smoothed image from the image to generate a noise image, wherein selectively reducing noise in the image based on the noise modulation map to generate the final image comprises blending the noise image with the smoothed image according to the noise modulation map.

2. The method of claim 1, wherein generating the noise modulation map comprises inputting the image and the plurality of parameters to a noise modulation model that outputs the noise modulation map.

3. The method of claim 2, wherein the noise modulation model comprises a trained deep learning model.

4. The method of claim 2, wherein the noise modulation model comprises a linear or non-linear regression model.

5. The method of claim 2, wherein the plurality of parameters includes at least two parameters selected from acquisition parameters relating to the acquisition of the image, display parameters relating to the display of the final image, and subject parameters relating to the subject being imaged.

6. The method of claim 5, wherein the acquisition parameters include one or more of a tube voltage applied to an x-ray source during image acquisition, a tube current applied to the x-ray source during image acquisition, a focal spot size, a distance between the x-ray source and an x-ray detector, an amount of spectral filtration, a size of an anti-scatter grid disposed in front of the x-ray detector, and a detector pixel of the x-ray detector.

7. The method of claim 5, wherein the display parameters include one or more of a type of display device for displaying the final image, an image processing technique, and a field-of-view.

8. The method of claim 5, wherein the subject parameters include a thickness of the subject.

9. A method, comprising:
    controlling an x-ray source and an x-ray detector to acquire an image of a subject;
    measuring, based on the image and a plurality of parameters, an estimated amount of noise in each pixel of the image;

applying noise reduction throughout the image to generate a smoothed image;

subtracting the smoothed image from the image to generate a noise image;

multiplying the estimated amount of noise in each pixel of the image with the noise image to generate a modulated noise image;

adding the modulated noise image to the smoothed image to generate a final image; and displaying the final image.

10. The method of claim 9, wherein measuring the estimated amount of noise in each pixel of the image comprises inputting the image and the plurality of parameters to a noise modulation model that outputs the estimated amount of noise in each pixel of the image.

11. The method of claim 10, wherein the estimated amount of noise in each pixel of the image comprises an estimate of signal-to-noise ratio determined for each pixel based on the image and the plurality of parameters.

12. The method of claim 10, wherein the noise modulation model comprises one of a trained deep learning model, a linear regression model, or a non-linear regression model.

13. The method of claim 9, wherein the plurality of parameters includes a peak tube kilovoltage applied to the x-ray source during acquisition of the image, and a size of detector pixels of the x-ray detector.

14. The method of claim 13, wherein the plurality of parameters further includes one or more of a tube current applied to the x-ray source during image acquisition, a focal spot size, a distance between the x-ray source and the x-ray detector, an amount of spectral filtration, a size of an anti-scatter grid disposed in front of the x-ray detector, a type of display device for displaying the final image, an image processing technique, a field-of-view for displaying the final image, and a thickness of the subject.

15. A system, comprising:
an x-ray source for generating x-rays;
an x-ray detector configured to detect the x-rays;
a display device; and
a processor configured with instructions in non-transitory memory that when executed cause the processor to:
acquire an image of a subject;
generate, based on the image and a plurality of parameters, a noise modulation map comprising an estimated amount of noise in each pixel of the image;
selectively reduce noise in the image based on the noise modulation map to generate a final image; and
display, via the display device, the final image; and
wherein the processor is further configured with instructions in the non-transitory memory that when executed cause the processor to:
pre-process the image to generate a processed image, the pre-processing including at least a normalization of photon counts;
apply noise reduction throughout the processed image to generate a smoothed image;
subtract the smoothed image from the processed image to generate a noise image;
multiply the noise modulation map with the noise image to generate a modulated noise image; and
add the modulated noise image to the smoothed image to generate a final image.

16. The system of claim 15, wherein, to generate the noise modulation map, the processor is configured with instructions in the non-transitory memory that when executed cause the processor to input the image and the plurality of parameters to a noise modulation model that outputs the noise modulation map.

17. The system of claim 16, wherein the noise modulation model comprises one or more of a trained deep learning model, a linear regression model, and a non-linear regression model.

18. The system of claim 15, wherein the plurality of parameters includes two or more of a peak tube kilovoltage applied to the x-ray source during image acquisition, a tube current applied to the x-ray source during image acquisition, a focal spot size, a distance between the x-ray source and the x-ray detector, an amount of spectral filtration, a size of an anti-scatter grid disposed in front of the x-ray detector, a size of detector pixels in the x-ray detector, a type of the display device for displaying the final image, an image processing technique for processing the image, a field-of-view for displaying the final image, and a thickness of the subject.

* * * * *